(12) United States Patent
Lintulampi

(10) Patent No.: US 7,075,907 B1
(45) Date of Patent: Jul. 11, 2006

(54) METHOD FOR SIGNALLING DTX PERIODS AND ALLOCATION OF NEW CHANNELS IN A STATISTICAL MULTIPLEXED RADIO INTERFACE

(75) Inventor: Raino Lintulampi, Kiviniemi (FI)

(73) Assignee: Nokia Corporation, Espoo (FI)

( * ) Notice: Subject to any disclaimer, the term of this patent is extended or adjusted under 35 U.S.C. 154(b) by 1038 days.

(21) Appl. No.: 09/587,993

(22) Filed: Jun. 6, 2000

(51) Int. Cl.
*H04Q 7/00* (2006.01)
(52) U.S. Cl. ................ 370/329; 704/215; 455/450
(58) Field of Classification Search ........ 370/328–329, 370/235, 331, 341, 431, 441, 335, 342, 442, 370/433–437; 704/215–219; 455/450–452, 455/509–515
See application file for complete search history.

(56) References Cited

U.S. PATENT DOCUMENTS

| 5,299,198 | A | 3/1994 | Kay et al. ................. 370/95.3 |
| 5,835,889 | A | 11/1998 | Kapanen ..................... 704/220 |
| 5,960,389 | A | 9/1999 | Jarvinen et al. ............ 704/215 |
| 6,621,809 | B1* | 9/2003 | Lee et al. ................... 370/335 |
| 6,724,740 | B1* | 4/2004 | Choi et al. .................. 370/335 |
| 6,751,468 | B1* | 6/2004 | Heubel et al. .............. 455/518 |
| 6,768,728 | B1* | 7/2004 | Kim et al. .................. 370/342 |

FOREIGN PATENT DOCUMENTS

| EP | 0407367 A2 | 5/1990 |
| EP | 0872982 A1 | 3/1998 |
| EP | 0984641 A2 | 3/2000 |
| WO | WO 98/57509 | 12/1998 |
| WO | WO 00/62491 | 10/2000 |

OTHER PUBLICATIONS

Tafazolli et al; "A Novel Multiple Access Scheme For Third Generation Mobile Phone/Personal Communication System"; IEEE International Conference on Selected Topics in Wireless Communications, New York, NY; Jun. 25, 1992; pp. 21-26.

* cited by examiner

*Primary Examiner*—Chi Pham
*Assistant Examiner*—Phuc Tran
(74) *Attorney, Agent, or Firm*—Harrington& Smith, LLP

(57) ABSTRACT

A method for operating a wireless communications system includes a step of signalling, between a mobile station to a network, that the mobile station or the network is temporarily ceasing transmission of circuit switched information (DTX), which could be voice frames or data frames. For the case of voice, the method further includes a step, executed in the network, of determining if a current uplink or downlink voice traffic channel that is assigned to the mobile station can be retained by the mobile station, or whether the current uplink or downlink voice traffic channel must be released by the mobile station. Only if it is determined that the current uplink or downlink voice traffic channel must be released by the mobile station, does the network signal to the mobile station to release the channel. The step of determining preferably considers a current network requirement for uplink voice traffic channels, and the step of signalling that the mobile station or the network is temporarily ceasing transmission of voice frames occurs in response to the mobile station or the network entering a Discontinuous Transmission (DTX) state. The retained channel may be later released during the DTX period, if the network determines that the channel is required to support another mobile station.

27 Claims, 3 Drawing Sheets

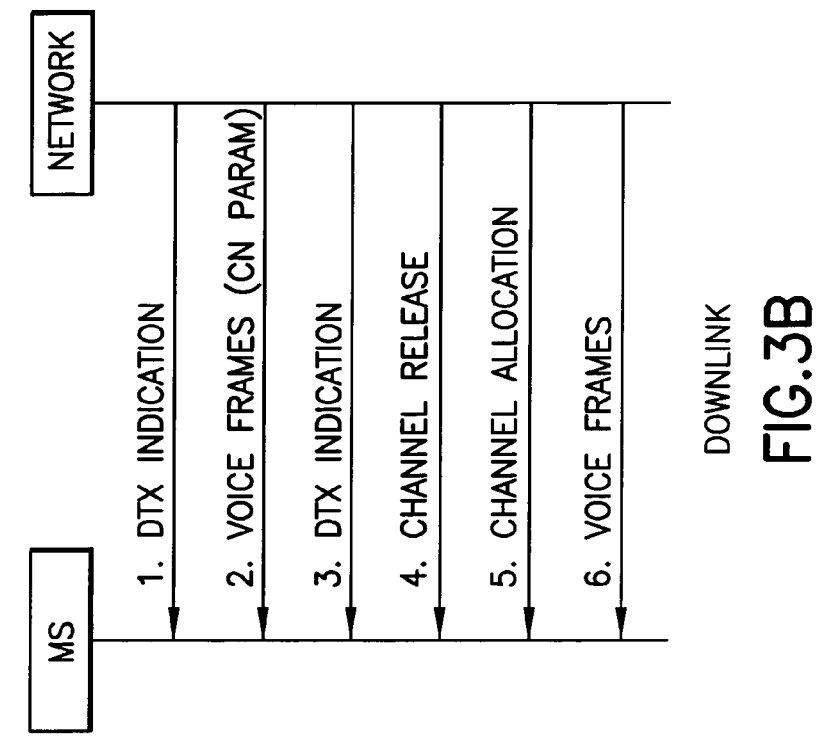
FIG. 3B DOWNLINK
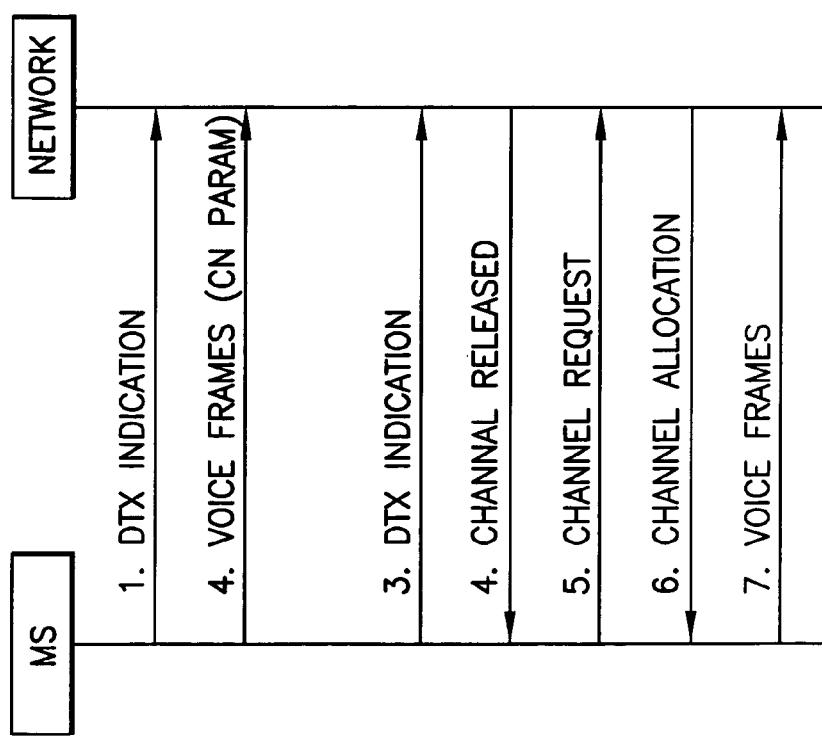
FIG. 3A UPLINK

METHOD FOR SIGNALLING DTX PERIODS AND ALLOCATION OF NEW CHANNELS IN A STATISTICAL MULTIPLEXED RADIO INTERFACE

FIELD OF THE INVENTION

This invention relates generally to method and apparatus for transmitting and receiving voice and data frames over a wireless interface and, more particularly, relates to methods and apparatus for transmitting and receiving voice and data frames between a wireless user terminal and a network operator in a digital packet data cellular telecommunications system.

BACKGROUND OF THE INVENTION

Modern wireless telecommunications systems are evolving to provide high speed packet data services for users of mobile equipment. One example is an ability to provide Internet access to a user of mobile equipment. A wireless system that is rapidly evolving in this direction is a Time Division, Multiple Access (TDMA) system known as the Global System for Mobile Communication (GSM), in particular enhanced versions of GSM known as GSM+, GPRS (General Packet Radio Services) and EGPRS (Enhanced General Packet Radio Services).

In the ongoing GSM/GPRS Release '00 (Release 2000) standardization process two significant issues have arisen. First, the GSM EDGE radio access network (GERAN) is specified as a new access network to the $3^{rd}$ generation Universal Mobile Telecommunication System (UMTS) core network. Second, voice services are also to be provided through the packet switched core network (GPRS). However, voice traffic has a much more stringent delay requirement, both in the terms of absolute delay and delay jitter, than data services. As such, voice traffic is handled differently in the radio interface, i.e., the channel requests and allocations are not made on a voice packet (frame) basis, but instead a channel is allocated to a voice user for an unpredictable period of time. This type of allocation is referred to as either a dedicated mode or as a fixed allocation mode, and it resembles channel allocation in the conventional circuit switched voice mode.

In order to take advantage of the packet network in the radio interface, a "statistical multiplexing" approach has been proposed for GERAN '00. In the proposed statistical multiplexing approach the channel allocated for a first voice user can be reallocated to a second voice user when the first user goes to the Discontinuous Transmission (DTX) mode, i.e., when there are no speech frames to be transmitted or received (typically during pauses in speech). When the user's mobile station is again required to transmit or receive voice frames, a new channel allocation is required. In the uplink direction (mobile station to network) a channel request is required to be sent to indicate the beginning of a new voice period.

However, the inventor has realized that if the current channel is released each time a DTX period occurs, then an inordinate amount of signaling is required for performing the required channel reallocations.

More particularly, in current digital cellular wireless communication systems such as GSM, a channel that is allocated to the mobile station is dedicated to that mobile station for as long as a call is ongoing, whether or not there is voice/data to be transmitted. However, in the proposed statistical multiplexing approach, the same uplink channel or downlink channel may be allocated to another mobile station when the first mobile station is not transmitting or receiving voice or data (i.e., during the DTX period).

Referring to FIG. 1A, the required release and allocation of uplink channels would clearly result in a large amount of signalling overhead. For example, in step 1 the mobile station indicates a start of a DTX period. The start of a DTX period may typically occur during a normal pause in speech. When the mobile station is required to again send voice frames it must request a channel, shown in step 2, and the network allocates a new channel in step 3. The new voice frames are transmitted in step 4. The process is repeated for the next DTX period, as can be seen in steps 5–7, and for each DTX period thereafter.

Referring now to FIG. 1B, a similar situation exists in the downlink direction. In step 1 the network indicates a DTX period to the mobile station. In response, the mobile station releases the currently allocated downlink voice traffic channel and begins monitoring a control channel in order to obtain a new channel allocation. In step 2, at the end of the downlink DTX period, the network sends the new downlink traffic channel allocation to the mobile station, to which the mobile station responds by tuning to the new traffic channel. At step 3 the mobile station begins receiving voice frames. This process can be repeated many times during a call, as indicated at steps 4, 5 and 6.

It can be appreciated that with normal pauses in speech occurring in both the uplink and the downlink directions many times during a typical call, a large amount of additional signalling would be required to implement the statistical multiplexing proposal.

In addition to the increased signalling burden, another perceived problem with this proposed type of statistical multiplexing is that some signal at the beginning of a first talk burst can be clipped after the DTX period ends, while waiting for a new channel to be allocated. This is due primarily to the finite delay required for the channel allocation process to complete. Since physical channels are being allocated to the mobile station, this time delay also includes the time required to retune the transmitter (uplink) or receiver (downlink) to the newly allocated traffic channel, to settle the transmitter or receiver, and to begin transmitting or receiving the next voice frames.

Another perceived disadvantage inherent in the proposed statistical multiplexing approach is that it becomes very difficult or impossible to transmit "comfort noise" (CN) parameters during the DTX period. CN parameters are generated during the DTX period to characterize or estimate the background audio noise, and are periodically transmitted from (or to) the mobile station. The use of the CN parameters helps to avoid unnatural transitions in background noise that may occur during the DTX period, and when going from the DTX period to the next speech period. Reference with regard to the generation of comfort noise parameters and the DTX period in general can be made to commonly assigned U.S. Pat. No. 5,960,389 "Methods for Generating Comfort Noise During Discontinuous Transmission", by Kari Jarvinen et al., and to commonly assigned U.S. Pat. No. 5,835,889, "Methods and Apparatus for Detecting Hangover Periods in a TDMA Wireless Communication System Using Discontinuous Transmission", by Pekka Kapanen.

In the instant case, if the mobile station automatically relinquishes the allocated uplink channel when the DTX period begins, then the mobile station loses the ability to transmit the CN parameters to the network. As a result, the perceived voice quality would be degraded. Although an uplink control channel might be used for this purpose, it can be appreciated that placing the additional CN parameters signalling burden on the relatively scarce control channels (as compared to the more numerous traffic channels) is not an optimum solution to this problem. The same disadvantages exist in the downlink direction.

Although discussed above in the context of voice traffic, the statistical multiplexing technique could be used as well for circuit switched data channels, as DTX has been defined, at least in GSM, also for circuit switched data (the CN parameters are, of course, not employed).

As can thus be appreciated from the foregoing discussion, the requirement to provide voice and circuit switched data services in a packet switched wireless network, particularly one that employs statistical multiplexing approaches for placing more than one user on a channel, presents a number of technical challenges that have heretofore not been adequately addressed.

OBJECTS AND ADVANTAGES OF THE INVENTION

It is a first object and advantage of this invention to provide an improved method to release and assign channels in a wireless communications system that employs a statistical multiplexing technique.

It is another object and advantage of this invention to provide an improved method to release and assign channels that does not automatically release a mobile station's currently allocated channel when the mobile station enters the DTX mode, but that instead selectively releases the channel when necessary.

It is a further object and advantage of this invention to provide a method that releases a mobile station's currently allocated channel, when the mobile station enters the DTX mode, only upon demand, thereby enabling comfort noise parameters to be transmitted and received during the DTX period until such time that the mobile station is commanded to release the currently allocated channel.

SUMMARY OF THE INVENTION

The foregoing and other problems are overcome and the objects of the invention are realized by methods and apparatus in accordance with embodiments of this invention.

This invention relates to the signalling of DTX periods and to the allocation of new channels for use in a statistical multiplexing approach to providing circuit-switched services in a packet radio network, such as one currently being specified for GERAN Release '00 (Release 2000). However, these teachings have a broader applicability, and can be employed as well in circuit switched systems, such as GSM and other digital wireless systems.

These teachings provide a method that releases a channel, either an uplink channel or a downlink channel, only when some channel release criterion or criteria are satisfied, such as when the channel is required by another user. This reduces the signalling load significantly. Furthermore, in the situation where there are an adequate number of available channels, and where channel release is not performed, the signalling load may be about the same as in the current GSM system. The channels could be channels that carry circuit switched voice information or circuit switched data information.

Another advantage realized by the use of these teachings is that voice quality is improved. More particularly, when the channel is released in the DTX mode, then while waiting for a new channel allocation the first bits of a first speech burst can be lost. By avoiding a constant need for channel reallocation, the teachings of this invention improve the overall voice quality, as the likelihood of losing bits from voice (or data) frames is reduced.

Voice quality can also be improved by enabling the transmission and reception of CN parameters during the DTX period, by not automatically relinquishing, at the start of the DTX period, the channel over which the CN parameters are sent.

A method is disclosed for operating a wireless communications system, as is a system that operates in accordance with the method. The method includes a step of signalling, between a mobile station and a wireless network, that one of the mobile station or the network is temporarily ceasing transmission of circuit switched information. The method further includes a step, executed in the network, of determining if a current traffic channel that is assigned to the mobile station can be retained by the mobile station, or whether the current traffic channel must be released by the mobile station. Only if it is determined that the current traffic channel must be released by the mobile station, does the network signal to the mobile station to release the channel. The step of determining preferably considers a current network requirement for uplink or downlink traffic channels, and the step of signalling that one of the mobile station or the network is temporarily ceasing transmission of circuit switched information occurs in response to the mobile station or the network entering a Discontinuous Transmission (DTX) state.

For the case where the step of determining determines that the current traffic channel that is assigned to the mobile station can be retained by the mobile station, the method further includes steps of, at some future time, determining that at least one new circuit switched frame is required to be transmitted; and transmitting the at least one new frame on the current traffic channel that is assigned to the mobile station.

Also for the case where the step of determining determines that the current traffic channel can be retained by the mobile station, the method further includes steps executed in the network of determining at some future time, during the period that the mobile station or the network has temporarily ceased transmission of circuit switched frames, that the current traffic channel must be released by the mobile station and, if it is determined that the current traffic channel must be released by the mobile station, signalling from the network to the mobile station to release the channel.

For the case of voice frames and voice traffic channels, and when not released during the time that the mobile station or the network has temporarily ceased transmission of voice frames, the retained uplink voice traffic channel can be used to transmit CN parameters from the mobile station to the network, and the retained downlink voice traffic channel can be used to transmit CN parameters from the network to the mobile station, thereby improving the overall call quality.

BRIEF DESCRIPTION OF THE DRAWINGS

The above set forth and other features of the invention are made more apparent in the ensuing Detailed Description of the Invention when read in conjunction with the attached Drawings, where:

FIG. 3A depicts a signalling flow for normal voice transmission and DTX states in the uplink direction, in accordance with these teachings, wherein the signalling overhead is reduced by not automatically releasing a mobile station's current uplink channel when the mobile station enters the DTX mode; and FIG. 3B depicts a signalling flow for normal voice transmission and DTX states in the downlink direction, further in accordance with these teachings, wherein the signalling overhead is reduced by not automatically releasing a mobile station's current downlink channel when the mobile station enters the DTX mode.

DETAILED DESCRIPTION OF THE INVENTION

The teachings herein reduce the signalling load significantly during the statistical multiplexing mode of operation, as a channel (uplink or downlink) is allocated to a mobile station and remains allocated to the mobile station until the network operator explicitly signals that the channel must be released. If the network operator is not capacity limited, then the signalling load may be at comparable levels to those experienced in conventional circuit switched networks, such as in the GSM system.

Figure 1:
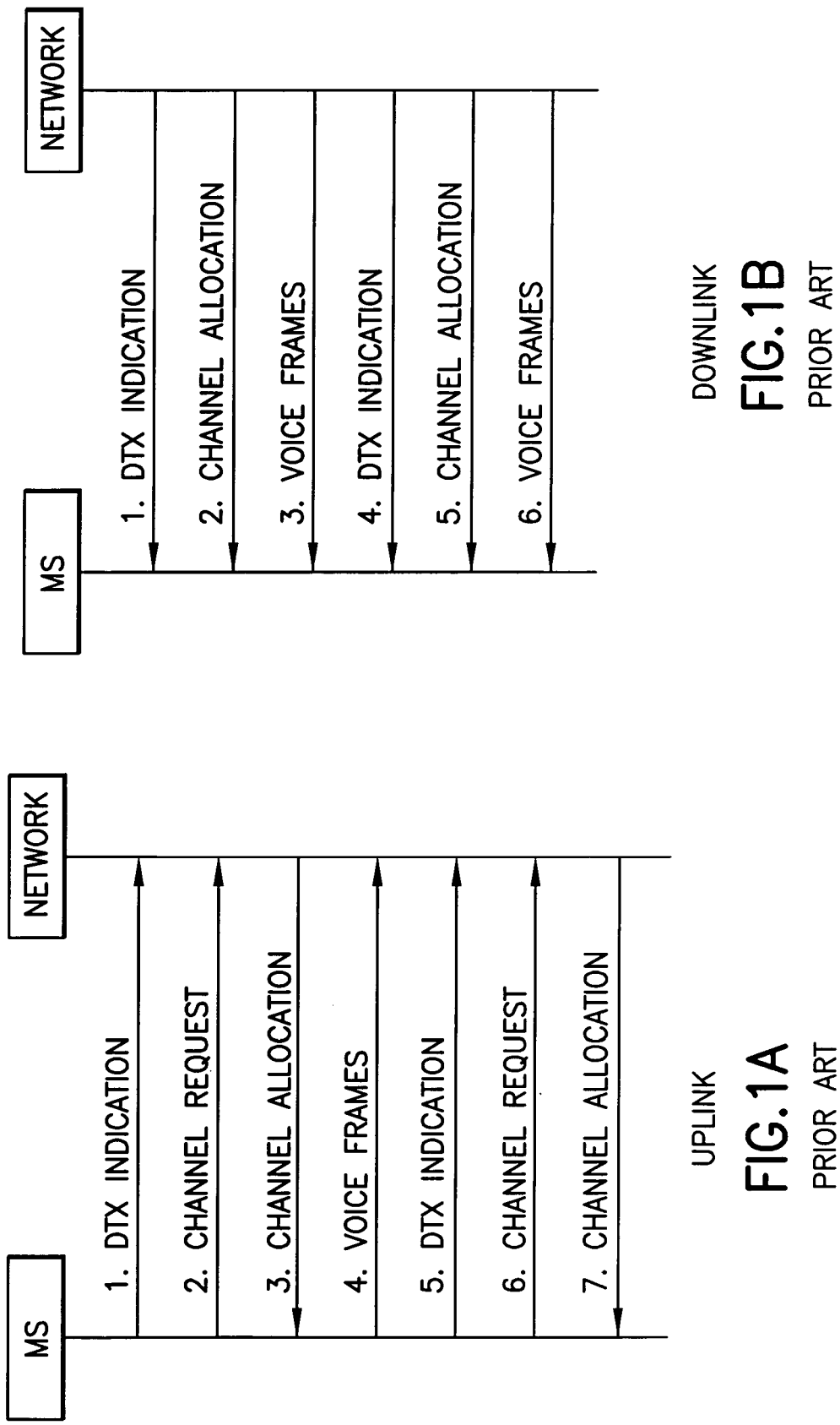
FIG. 1A depicts a proposed signalling flow for normal voice transmission and DTX states in the uplink direction, and illustrates the large amount of signalling overhead that is an object of these teachings to significantly reduce.
FIG. 1B depicts a proposed signalling flow for normal voice transmission and DTX states in the downlink direction, and also illustrates the large amount of signalling overhead that is an object of these teachings to significantly reduce.

In a simulation case, where a call blocking rate was about 5%, the additional channel allocation signalling was about 5% of the detected DTX periods, while in the known (proposed) approach the number of reallocations was the same as the number of DTX periods (see FIGS. 1A and 1B). Using both the known technique and the technique in accordance with these teachings, no call blocking was experienced in the simulation. This estimation is based on approximate signalling simulations in the uplink direction, where the DTX time was on average 50% of the call duration, where the occurrence of DTX periods was randomized within calls, and where the occurrence of calls were equally distributed within the simulation period. It is expected that the number of reallocations may be decreased even further by the use of an even better optimized channel allocation algorithm.

The ensuing description will focus on the use of the teachings of this invention for voice traffic. However, and as was mentioned previously, many of these teachings apply as well to circuit switched data traffic. Facsimile transmissions are one example of circuit switched data traffic. As such, a reference to circuit switched traffic channels found herein may be a reference to both voice and data traffic.

As was indicated above, one known problem with statistical multiplexing is that some period at the beginning of a talk burst is clipped when the DTX period ends and a new channel is allocated, due to the delay of the channel allocation. With the method in accordance with these teachings the amount of clipped talk bursts is reduced significantly (clipping that occurs when a new channel is allocated after the mobile station exits the DTX mode), as compared to the known method wherein a new channel allocation is performed for each DTX period.

As was also indicated above, when not released during the DTX period the retained uplink voice traffic channel can be used to transmit CN parameters from the mobile station to the network, and the retained downlink voice traffic channel can be used to transmit CN parameters from the network to the mobile station, thereby improving the overall call quality.

Figure 2:
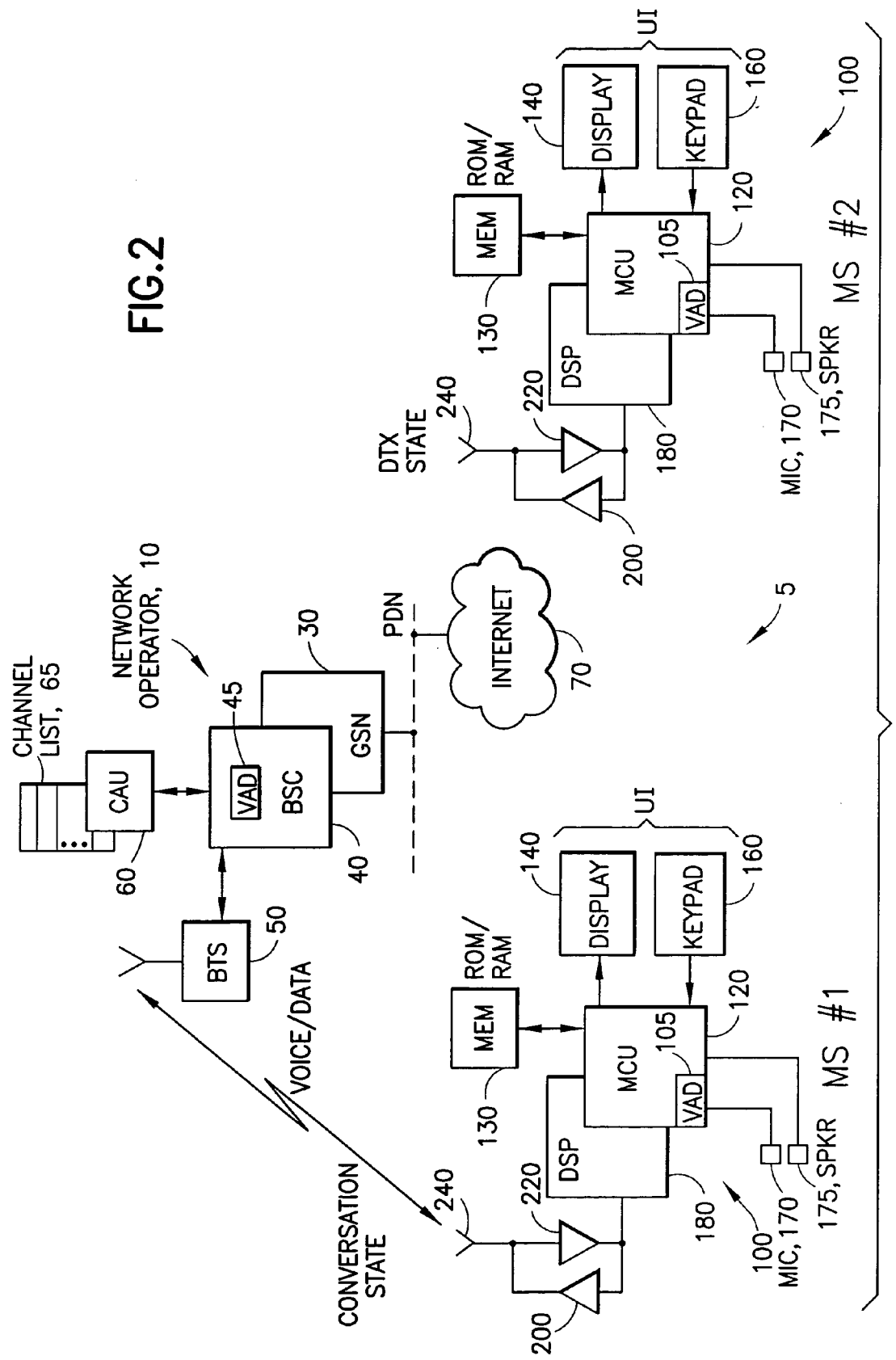
FIG. 2 is a simplified block diagram of a wireless communications system that includes a plurality of mobile stations and a network operator that includes a channel allocation unit that operates in accordance with the teachings herein.

Referring to FIG. 2, there is illustrated as a simplified block diagram an embodiment of a wireless communications system 5 that is suitable for practicing this invention. The system 5 includes a plurality of mobile stations 100. Two mobile stations (MSs) are shown in FIG. 2, with one being designated MS#1 and the other MS#2. FIG. 2 also shows an exemplary network operator 10 having, for example, a GPRS support node (GSN) 30 for connecting to a telecommunications network, such as the Public Packet Data Network (PDN) packet switched telecommunications network, at least one base station controller (BSC) 40, and typically a plurality of base transceiver stations (BTS) 50 that transmit in a forward or downlink direction both physical and logical channels to the mobile stations 100 in accordance with a predetermined air interface standard. A reverse or uplink communication path also exists from the mobile station 100 to the network operator 10, which conveys mobile station originated access requests and traffic, including the channel requests and voice frames, such as frames emanating from a voice coder.

In a preferred, but not limiting, embodiment of these teachings, the air interface standard can conform to any standard that enables packet data transmissions to occur with the mobile stations 100, such as Internet 70 access and web page downloads. In the presently preferred embodiment of this invention the air interface standard is a Time Division Multiple Access (TDMA) air interface that supports the enhanced GPRS capabilities disclosed herein.

The mobile station 100 typically includes a microcontrol unit (MCU) 120 having an output coupled to an input of a display 140 and an input coupled to an output of a keyboard or keypad 160. The mobile station 100 may be considered to be a handheld radiotelephone, such as a cellular telephone or a personal communicator. The mobile station 100 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user.

The MCU 120 is assumed to include or be coupled to some type of a memory 130, including a read-only memory (ROM) for storing an operating program, as well as a random access memory (RAM) for temporarily storing required data, scratchpad memory, received packet data, packet data to be transmitted, voice frames being assembled and received voice frames, etc. A separate, removable SIM (not shown) can be provided as well, the SIM storing, for example, a preferred Public Land Mobile Network (PLMN) list and other subscriber-related information. The ROM is assumed, for the purposes of this invention, to store a program enabling the MCU 120 to execute the software routines required to implement the transmission of voice frames and channel requests in accordance with the teachings herein, as well as to provide a suitable user interface (UI), via display 140 and keypad 160, with a user. A microphone 170 and a speaker 175 are also provided for enabling the user to conduct voice calls.

The mobile station 100 also contains a wireless section that includes a digital signal processor (DSP) 180, or equivalent high speed processor, as well as a wireless transceiver comprised of a transmitter 200 and a receiver 220, both of which are coupled to an antenna 240 for communication with the network operator 10. Packet data and voice data are transmitted and received through the antenna 240.

The network operator 10 includes a channel allocation unit (CAU) 60, wherein is stored a list 65 of allocated and free channels. The channel allocation unit 60 also includes the logic for implementing the selective channel release procedure in accordance with these teachings.

Reference in this regard can be had to FIG. 3A, which depicts the presently preferred embodiment of signalling for DTX indication and channel reallocation in accordance with the teachings herein. It is assumed that an uplink voice channel was previously allocated to the mobile station MS#1 in FIG. 2, such as at call setup or during a handoff to the currently serving BTS 50. In step 1 the mobile station 100 indicates to the network operator that it is entering the DTX mode. In a typical case a voice activity detector (VAD) function 105 within the mobile station 100 will have detected a cessation of user speech, and the DTX mode is subsequently entered. Assume now for this case that the network operator 10 currently has available uplink channels for allocation to other mobile stations, so that the uplink channel originally allocated to the mobile station 100 is not required to be released. As such, and in accordance with these teachings, the channel allocation unit 60 of the network operator 10 does not send a channel release indication to the mobile station 100, and does not release the previously allocated uplink channel.

In step 2 the mobile station 100 is again required to send voice frames, and because the previously allocated uplink channel was not released by the network operator 10, the mobile station 100 can immediately begin sending voice frames on the previously allocated uplink channel. In this manner no clipping of the voice frames is experienced due to the requirement for the mobile station 100 to request a new channel allocation, and then wait to be assigned a new channel.

In step 3 the mobile station 100 again indicates to the network operator 10 that it is entering the DTX mode, but now assume in step 4 that the network operator 10 informs the mobile station 100 that the previously allocated uplink channel is no longer allocated to the mobile station 100, i,e., the channel has been released. The channel release indication may occur at any time after the DTX indication has been sent by the mobile station 100 in step 3, i.e., it can be sent immediately or after some number of seconds. For example, if at first the channel allocation unit 60 has sufficient available uplink channels, the channel release message is not sent to the mobile station 100. However, if demand rises (e.g., the user of MS#2 begins to speak), and if the pool of available uplink channels is depleted or is nearly depleted, then the channel allocation unit 60 sends the channel release message to the mobile station 100, and returns the mobile station's current uplink channel to the pool of available channels (if not required immediately to be allocated to another mobile station, such as the MS#2). In any event, when the mobile station 100 is required to again send voice frames it must first request a new uplink channel, step 5, and the new uplink channel is subsequently allocated by the network operator 10 in step 6. In step 7 the voice frames are again transmitted by the mobile station 100, but this time the newly allocated uplink traffic channel is used.

Reference is now had to FIG. 3B, which depicts for the downlink case the presently preferred embodiment of signalling for DTX indication and channel reallocation in accordance with the teachings herein. It is assumed that a downlink link voice channel was previously allocated to the mobile station MS#1 in FIG. 2, such as at call setup or during a handoff to the currently serving BTS 50. In step 1 the network operator 10 indicates to the mobile station 100 that it is entering the DTX mode. In a typical case a network VAD function 45 will be located in the BSC 40, and will have detected a cessation of speech from the other party to the conversation. In response, the DTX mode is subsequently entered. Assume now for this case that the network operator 10 currently has available downlink channels for allocation to other mobile stations, so that the downlink channel originally allocated to the mobile station 100 is not required to be released. As such, and in accordance with these teachings, the channel allocation unit 60 of the network operator 10 does not send a channel release indication to the mobile station 100, and does not release the previously allocated downlink channel.

In step 2 the network 10 is again required to send voice frames, and because the previously allocated downlink channel was not released by the network operator 10, the network 10 can immediately begin sending voice frames on the previously allocated downlink channel. In this manner no clipping of the voice frames is experienced due to the requirement for the mobile station 100 to be assigned a new downlink channel allocation.

In step 3 the network operator 10 again indicates to the mobile station 100 that it is entering the DTX mode, but now assume in step 4 that the network operator 10 informs the mobile station 100 that the previously allocated downlink channel is no longer allocated to the mobile station 100, i,e., the channel has been released. As in the uplink case, the downlink channel release indication may occur at any time after the DTX indication has been sent by the network operator 10 in step 3, i.e., it can be sent immediately or after some number of seconds. After receiving the downlink channel release message, the mobile station 100 begins monitoring a control channel for a next channel allocation message from the network operator 10. When the network operator 10 is required to again send voice frames it must first send the channel allocation message to the mobile station 100 identifying a new downlink traffic channel, step 5, and in step 6 the voice frames are again transmitted by the network operator 10, but now utilizing the newly allocated downlink traffic channel.

Note in FIGS. 3A and 3B, during steps 2, before voice frames are sent over the retained uplink or downlink traffic channel, that CN parameters may be sent as well, thereby overcoming the problem that arises when CN parameters are not able to be sent during the DTX period.

The signalling procedure is straightforward between the network operator 10 and the mobile station 100, and each network operator may implement its own channel allocation algorithm specification. For example, the network operator 10 may send the channel release message only when all available channels in the channel list 65 are currently allocated, or it may send the channel release message when some minimum (threshold) number of available channels remain to be allocated. The minimum number of channels may be a fixed number, or it may be a variable number depending on, for example, the time of day, the day of the week, etc.

Further with regard to signalling, it may be preferred that the mobile station 100 acknowledge receipt of the channel release message from the network 10, so that the same channel is not inadvertently allocated to two mobile stations. The use of guard times and similar mechanisms to prevent an inadvertent simultaneous transmission from two mobile stations, in the event that one of the mobile stations does not correctly receive the channel release message, can also be used. Those skilled in the art may derive a number of different signalling protocols for accomplishing these and related purposes.

It should also be remembered that many of the teachings of this invention apply as well to data traffic, such as circuit switched data traffic, wherein a DTX or a DTX-like capability has been defined in the wireless network, and where the data is transferred in frames, or is transferred in structures resembling frames.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a wireless telecommunications system, comprising steps of:
   signalling, between a mobile station to a network, that one of the mobile station or the network is temporarily ceasing transmission of frames;
   at the network and in response to the signalling that one of the mobile station or the network is temporarily ceasing transmission of frames, determining if a current traffic channel that is assigned to the mobile station can be retained by the mobile station, or whether the current traffic channel must be released by the mobile station; and
   if it is determined that the current traffic channel must be released by the mobile station, signalling from the network to the mobile station to release the channel.

2. A method as in claim 1, wherein the step of determining considers a current network requirement for traffic channels.

3. A method as in claim 1, wherein the step of signalling occurs in response to one of the mobile station or the network entering a Discontinuous Transmission (DTX) state.

4. A method as in claim 1, wherein the step of signalling occurs in response to a voice activity detector (VAD) function of one of the mobile station or the network detecting a cessation of voice.

5. A method as in claim 1, wherein for the case where the step of determining determines that the current traffic channel that is assigned to the mobile station can be retained by the mobile station, further comprising steps of:
   at some future time, determining that at least one new frame is required to be transmitted; and
   transmitting the at least one new frame on said current traffic channel that is assigned to the mobile station.

6. A method as in claim 1, wherein for the case where the step of determining determines that the current traffic channel that is assigned to the mobile station can be retained by the mobile station, further comprising steps of:
   at the network, determining, during the period that the mobile station or the network has temporarily ceased transmission of frames, that the current traffic channel must be released by the mobile station; and
   if it is determined that the current traffic channel must be released by the mobile station, signalling from the network to the mobile station to release the channel.

7. A method as in claim 1, wherein the current traffic channel is an uplink voice traffic channel.

8. A method as in claim 1, wherein the current traffic channel is a downlink voice traffic channel.

9. A method as in claim 1, wherein the current traffic channel is an uplink data traffic channel.

10. A method as in claim 1, wherein the current traffic channel is a downlink data traffic channel.

11. A method as in claim 1, wherein for the case where the step of determining determines that the current traffic channel that is assigned to the mobile station can be retained by the mobile station, and where the current traffic channel is a voice traffic channel, further comprising a step of transmitting comfort noise parameters over the retained voice traffic channel during the time that the mobile station or the network has temporarily ceased the transmission of voice frames.

12. A method for operating a wireless system that provides voice services, comprising steps of:
   detecting, in a mobile station, a cessation of user speech;
   in response, signalling from the mobile station to a network that the mobile station is entering a Discontinuous Transmission state;
   at the network and in response to the signalling that the mobile station is entering the Discontinuous Transmission state, based at least on a consideration of a current network requirement for uplink voice traffic channels, determining if a current uplink voice traffic channel that is assigned to the mobile station can be retained by the mobile station, or whether the current uplink voice traffic channel must be released by the mobile station; and
   only if it is determined that the current uplink voice traffic channel must be released by the mobile station, sending a channel release message from the network to the mobile station.

13. A method as in claim 12, wherein for the case where the step of determining determines that the current uplink voice traffic channel that is assigned to the mobile station can be retained by the mobile station, further comprising steps of:
   at some future time, determining in the mobile station that the DTX state is to end; and
   transmitting at least one new voice frame on the current uplink voice traffic channel that was retained by the mobile station.

14. A method as in claim 12, wherein for the case where the step of determining determines that the current uplink voice traffic channel that is assigned to the mobile station can be retained by the mobile station, further comprising steps of:
   at the network, determining during the DTX state of the mobile station that the current uplink voice traffic channel must be released by the mobile station; and
   in response, sending a channel release message from the network to the mobile station.

15. A method as in claim 12, wherein for the case where the step of determining determines that the current uplink voice traffic channel that is assigned to the mobile station can be retained by the mobile station, further comprising a step of transmitting comfort noise parameters over the retained uplink voice traffic channel during the time that the mobile station is in the DTX state.

16. A method for operating a wireless system that provides voice services, comprising steps of:
   detecting, in a component of the network, a cessation of speech;

in response, signalling from the network to a mobile station that the network is entering a Discontinuous Transmission state;

at the network and in response to the signalling that the network is entering the Discontinuous Transmission state, based at least on a consideration of a current network requirement for downlink voice traffic channels, determining if a current downlink voice traffic channel that is assigned to the mobile station can be retained by the mobile station, or whether the current downlink voice traffic channel must be released by the mobile station; and only if it is determined that the current downlink voice traffic channel must be released by the mobile station, sending a channel release message from the network to the mobile station.

17. A method as in claim 16, wherein for the case where the step of determining determines that the current downlink voice traffic channel that is assigned to the mobile station can be retained by the mobile station, further comprising steps of:

at some future time, determining in the network that the DTX state is to end; and transmitting at least one new voice frame on the current downlink voice traffic channel that was retained by the mobile station.

18. A method as in claim 16, wherein for the case where the step of determining determines that the current downlink voice traffic channel that is assigned to the mobile station can be retained by the mobile station, further comprising steps of:

at the network, determining during the DTX state of the network that the current downlink voice traffic channel must be released by the mobile station; and in response, sending a channel release message from the network to the mobile station.

19. A method as in claim 16, wherein for the case where the step of determining determines that the current downlink voice traffic channel that is assigned to the mobile station can be retained by the mobile station, further comprising a step of transmitting comfort noise parameters over the retained downlink voice traffic channel during the time that the network is in the DTX state.

20. A wireless system that provides voice services, comprising:

a mobile station comprising a detector for detecting a cessation of user speech and a transmitter for sending a message to a wireless network for indicating that the mobile station is entering a Discontinuous Transmission state; and a channel allocation unit in said wireless network that is responsive to a receipt of said message, and to a current requirement for uplink voice traffic channels, for determining if a current uplink voice traffic channel that is assigned to the mobile station can be retained by the mobile station, or whether the current uplink voice traffic channel must be released by the mobile station, and further comprising a wireless network transmitter that transmits, only if it is determined that the current uplink voice traffic channel must be released by the mobile station, a channel release message to the mobile station.

21. A system as in claim 20, wherein for the case where said channel allocation unit determines that the current uplink voice traffic channel that is assigned to the mobile station can be retained by the mobile station, said mobile station is operable for determining that the DTX state is to end, and transmitting at least one new voice frame on the current uplink voice traffic channel that was retained by the mobile station.

22. A system as in claim 20, wherein for the case where said channel allocation unit determines that the current uplink voice traffic channel that is assigned to the mobile station can be retained by the mobile station, said channel allocation unit is operable to determine, during the DTX state of the mobile station, that the current uplink voice traffic channel must be released by the mobile station and, in response, for transmitting a channel release message from the network to the mobile station.

23. A system as in claim 20, wherein said mobile station is responsive to the case where said channel allocation unit determines that the current uplink voice traffic channel that is assigned to the mobile station can be retained by the mobile station, for transmitting comfort noise parameters over the retained uplink traffic channel during the DTX state of the mobile station.

24. A wireless system that provides voice services, comprising:

a wireless network component comprising a detector for detecting a cessation of speech and a transmitter for sending a message to a mobile station for indicating that the wireless network is entering a Discontinuous Transmission state; and a channel allocation unit in said wireless network that is responsive to a generation of said message, and to a current requirement for downlink voice traffic channels, for determining if a current downlink voice traffic channel that is assigned to the mobile station can be retained by the mobile station, or whether the current downlink voice traffic channel must be released by the mobile station, and further comprising a wireless network transmitter that transmits, only if it is determined that the current downlink voice traffic channel must be released by the mobile station, a channel release message to the mobile station.

25. A system as in claim 24, wherein for the case where said channel allocation unit determines that the current downlink voice traffic channel that is assigned to the mobile station can be retained by the mobile station, said wireless network is operable for determining that the DTX state is to end, and transmitting at least one new voice frame on the current downlink voice traffic channel that was retained by the mobile station.

26. A system as in claim 24, wherein for the case where said channel allocation unit determines that the current downlink voice traffic channel that is assigned to the mobile station can be retained by the mobile station, said channel allocation unit is operable to determine, during the DTX state of the wireless network, that the current downlink voice traffic channel must be released by the mobile station and, in response, for transmitting a channel release message from the wireless network to the mobile station.

27. A system as in claim 24, wherein said wireless network is responsive to the case where said channel allocation unit determines that the current downlink voice traffic channel that is assigned to the mobile station can be retained by the mobile station, for transmitting comfort noise parameters over the retained downlink traffic channel during the DTX state of the wireless network.

* * * * *